Feb. 7, 1967 A. LENDER 3,303,284

FRAMING METHOD AND APPARATUS FOR DUOBINARY DATA TRANSMISSION

Filed Aug. 30, 1963 2 Sheets-Sheet 1

INVENTOR.
ADAM LENDER

BY

Lippincott, Ralls & Hendricson
ATTORNEYS

Feb. 7, 1967 A. LENDER 3,303,284

FRAMING METHOD AND APPARATUS FOR DUOBINARY DATA TRANSMISSION

Filed Aug. 30, 1963 2 Sheets-Sheet 2

INVENTOR.
ADAM LENDER

BY

Lippincott, Ralls & Hendricson

ATTORNEYS 3,303,284
FRAMING METHOD AND APPARATUS FOR DUOBINARY DATA TRANSMISSION

Adam Lender, Palo Alto, Calif., assignor, by mesne assignments, to Automatic Electric Laboratories, Inc., Northlake, Ill., a corporation of Delaware
Filed Aug. 30, 1963, Ser. No. 305,590
9 Claims. (Cl. 178—68)

This invention relates to a method and apparatus for framing two streams of binary data which are combined for duobinary transmission. More particularly, the invention provides a signal transmitted along with the duobinary waveform to enable the data at the receiver to be reconverted to the original two streams of binary data.

With the advent of duobinary data transmission, making possible transmission of data at twice the conventional bit speeds, a problem has arisen in making use of of this faster speed. The double transmission speed makes possible transmission of twice the volume of data in a given time; however, the binary data, in many instances, is readily available only at the slower bit rates. Thus, to take full advantage of the duobinary capacity, two streams of data at the slower bit rate are interleaved to form the faster data stream. The combined binary stream is converted to the duobinary waveform and so transmitted. It is therefore essential, that the receiver which converts the transmitted duobinary waveform to the interleaved binary data be able to detect which portion of the two interleaved streams belongs to each of the two original data streams.

To accomplish this identification, it has become conventional to include an extra bit (termed a framing bit) between each pair of bits (one from each stream) in the interleaved data. Obviously, however, this is not an efficient method of framing, for one extra bit must be transmitted for each two information bits, thus lowering by one-third the transmission rate of the information bits. Moreover, additional circuitry is required for both introduction and removal of the framing bits.

This invention provides a very simple way of uniquely identifying which series of transmitted pulses belongs to the first channel and which to the second without need for framing bits. Briefly, the method of this invention is carried out using the following steps:

(a) introducing into the duobinary pulses to be transmitted a sine wave of identical frequency to and in phase with one of the two series of binary pulses;

(b) isolating the sine wave at the receiver before it enters the post-demodulation filter and converting said sine wave into a series of clock pulses of identical frequency to and in phase with said one of the two series of binary pulses; and (c) separating the binary output pulses from the reconverter into (1) a first chain of binary pulses in phase with said series of clock pulses converted from said sine wave, said first chain being said one of said independent series of binary pulses transmitted, and (2) a second chain of binary pulses 180° out-of-phase with said clock pulses converted from said sine wave, said second chain being the other independent series of binary pulses transmitted.

It must be understood that the frequency of the sine wave is expressed in cycles per second (c.p.s.), but the bit speeds are expressed in bits per second (b.p.s.).

Briefly, the derivation of a duobinary waveform from a binary waveform is as follows: For a binary pulse of one amplitude level (either MARK or SPACE—for this illustration, let us assume SPACE), the corresponding duobinary pulse will have an amplitude of zero, falling within the inner of the three duobinary amplitude zones. For a binary pulse of the other amplitude level (MARK), the value of the corresponding duobinary pulse will be either + or —; that is, it will lie in one of the two outer amplitude zones. The first outer-zone pulse in a sequence may lie indifferently in either of the two outer zones; however, this first outer-zone pulse sets the pattern for the sequence.

Let us assume that a first outer-zone duobinary pulse (corresponding to a binary MARK) lies in the upper zone (+). The location of the next outer-zone duobinary pulse (corresponding to the next binary MARK) will depend upon the number of intervening inner-zone duobinary pulses (corresponding to binary SPACES). Should an even number of inner-zone pulses intervene (zero being here considered an even number), the next outer-zone pulse will be located in the same outer zone as its predecessor; should an odd number of pulses intervene, the next outer-zone pulse will be located in the zone opposite to its predecessor. For example, when the first outer-zone pulse lies in the upper zone (+), the next one will lie in the lower zone (—) following an odd number of inner-zone pulses, but will lie again in the upper zone if an even number of inner-zone pulses intervenes.

The following example illustrates the binary-duobinary conversion process:

BINARY sequence $a_n$:
000011001110110001101010000111011
DUOBINARY sequence $b_n$:
0000++00+++0——000++0—0+0000+++0——

For a more detailed description of the duobinary system, U.S. patent application Serial No. 299,379 may be referred to.

The duobinary wave form may be generated using digital circuitry, as will be more fully explained later. In such a digitally generated waveform, the energy at a frequency numerically equal in c.p.s. to one-half bit speed in b.p.s. is zero. The sine wave of frequency numerically equal in c.p.s. to one-half the duobinary bit speed in b.p.s. is added arithmetically to the center level of the three amplitude levels of the duobinary waveform, i.e., the level where the waveform has zero energy. This sine wave is used to identify one channel of the original two binary data channels. The specific point where the sine wave crosses the zero axis is generally used for this identification. The positive-going zero-crossing identifies one of the two binary channels, and the negative-going zero-crossing identifies the other channel. This, too, will be more fully explained and shown pictorially later. The sine wave is added to the duobinary waveform in such a phase relationship that the sine wave has zero amplitude at the point on the duobinary waveform used for detection in the receiver. Therefore, the sine wave in no way interferes with duobinary-binary reconversion in the receiver.

The details of the invention will be better understood by reference to the drawings, in which.

Figure 1:
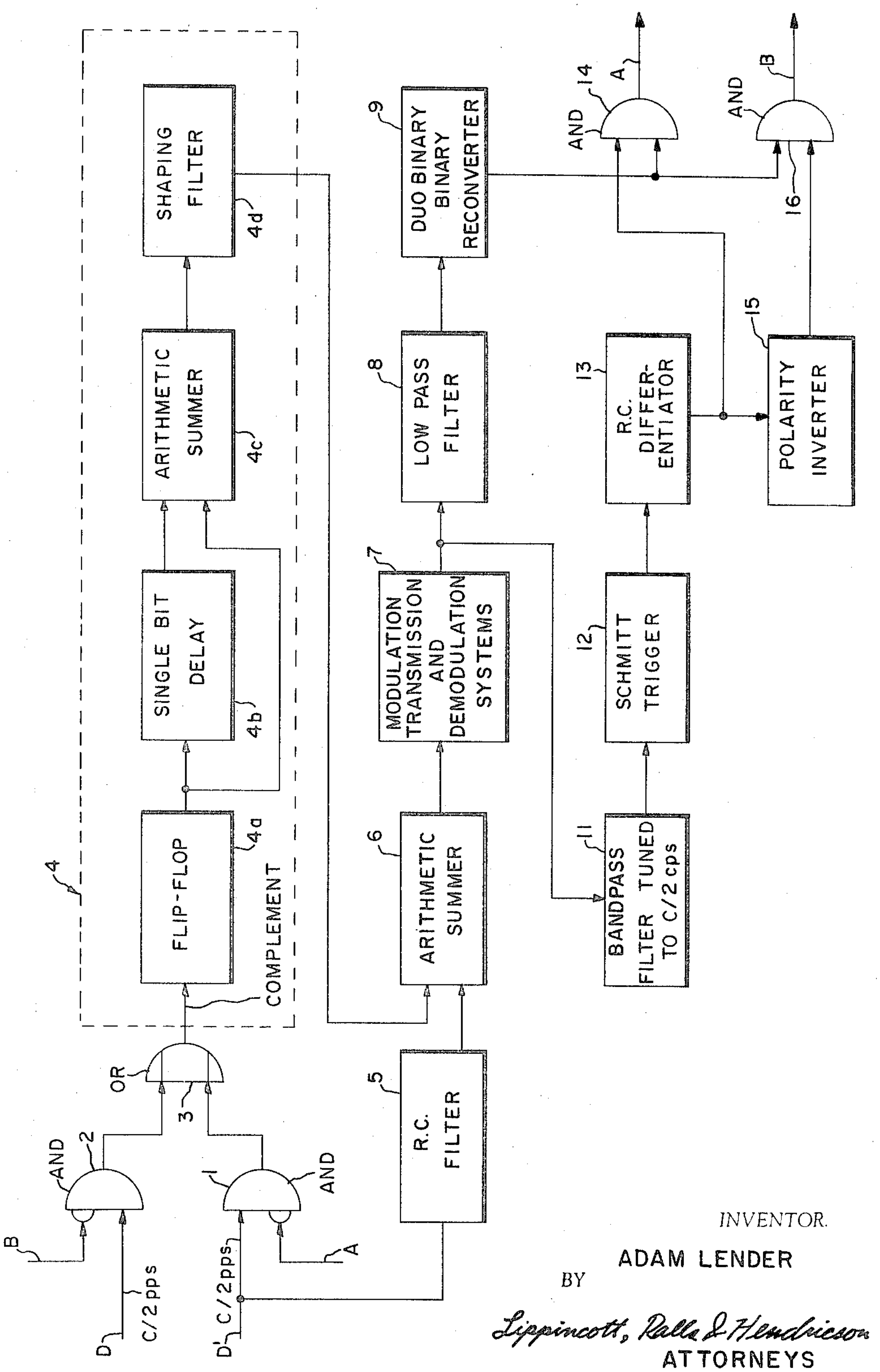
FIG. 1 is a block diagram of the apparatus of this invention.
Figure 2:
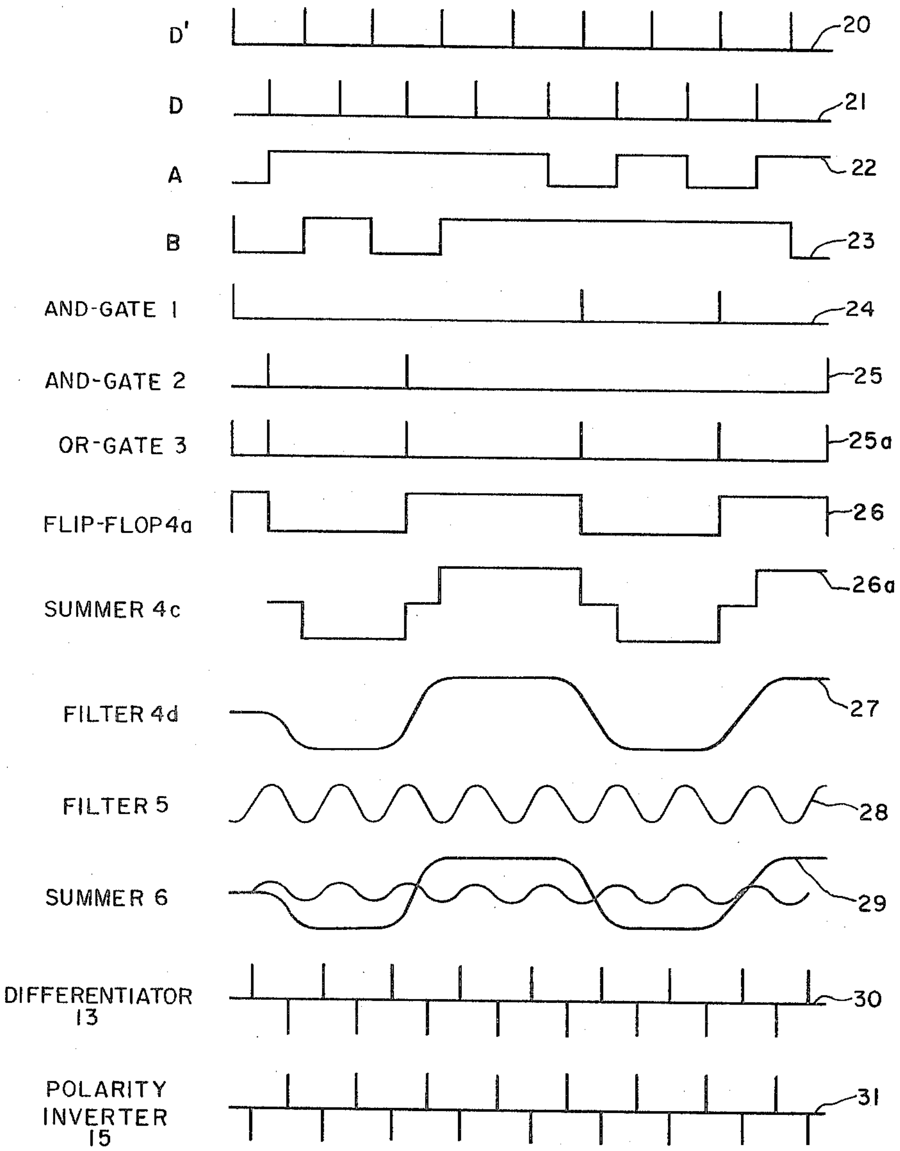
FIG. 2 is a graph showing the waveform relationships in various parts of the apparatus of this invention.

For easy reference to the drawings, the components of the apparatus of the invention shown in FIG. 1 have been given the numbers 1–16, and the waveforms shown in FIG. 2 have been given the numbers 20–31.

Now, referring both to FIGS. 1 and 2, two channels of binary data pulses A and B are passed to two AND-gates 1 and 2, respectively. These data are gated through the AND-gates using two series of clock pulses, each 180° out-of-phase with the other. Each such clock pulse series is provided by a conventional clock pulse generator at a rate in pulses per second (p.p.s.) numerically equal to one-half the data transmission speed in b.p.s. (hereinafter called C b.p.s.). These out-of-phase clock pulses may be obtained from a single clock generating clock pulses at a pulse rate in p.p.s. numerically equal to C. The clock pulses are then divided by two, using a single flip-flop (not shown) in a conventional manner. The output of one side of the flip-flop will generate a first phase of clock pulses at a pulse rate in p.p.s. equal to one-half the duobinary transmission rate in C; these first phase pulses will be referred to as "in-phase." Similarly, the other side of the same flip-flop will generate a second phase of clock pulses 180° apart from the clock pulses from the first side of the flip-flop; these latter pulses will be referred to as "out-of-phase" pulses. As shown in FIG. 1, the binary data of channel A is gated with clock pulse chain D'—the in-phase pulses. Binary data channel B is gated with clock pulse chain D—the out-of-phase clock pulses. The clock pulse chain D' is shown as waveform 20 in FIG. 2, and the clock pulse chain D is shown as waveform 21. Binary data channel A is shown as waveform 22 and binary data channel B as waveform 23.

AND-gates 1 and 2 will generate output pulses alternately into OR-gate 3, interleaving channels A and B each at C/2 p.p.s., so that the pulse rate out of OR-gate 3 is equal to C p.p.s. OR-gate 3 will have an output pulse only when either channel A or B is in the SPACE (zero) condition. It has no output pulse when both are MARK. The pulse from OR-gate 3 is numerically equal to the duobinary data transmission rate in b.p.s. The output pulse chain from AND-gate 1 is shown as waveform 24 in FIG. 2; the output pulse chain from AND-gate 2 is shown as waveform 25; and the output pulse chain from OR-gate 3 is shown as waveform **25*a***.

The output pulse chain from OR-gate 3 is passed into converter 4. Such a converter is a series of digital components and a filter adapted to convert the binary pulse chains A and B into a duobinary waveform. Modifications and variations of this converter may be found by reference to the abovementioned patent application. Flip-flop **4*a* changes state with each pulse from OR-gate 3. The output waveform from this flip-flop 4*a* is thus shown as waveform 26 in FIG. 2 and represents the digital differential of interleaved channels A and B. These pulses are passed to single digital delay 4*b* (generally a second flip-flop) and the outputs from flip-flop 4*a* and single bit digital delay 4*b* are both passed to arithmetic summer 4*c*. The three-level duobinary wave emergent from arithmetic summer 4*c* is shown as waveform 26*a* in FIG. 2; this waveform is rounded in shaping filter 4*d*. The resulting waveform from shaping filter 4*d* (the terminal portion of binary-duobinary converter 4) is shown as waveform 27 in FIG. 2. Note the rounded shape achieved in shaping filter 4*d***.

At the same time as this binary interleaved data is converted to duobinary, as discussed above, one of the two out-of-phase clock pulse chains in monitored. In this embodiment, clock pulse chain D', shown as waveform 20 in FIG. 2, monitored as it enters AND-gate 1. This clock pulse chain is passed to RC filter 4—a conventional shaping filter to convert the series of pulses 20 into a sine wave 28. The sine wave is phased with the clock pulses so that a positive-going (uphill) zero-crossing corresponds to each pulse of pulse chain D' (waveform 20). Consequently, each negative zero-crossing of waveform 28 corresponds to a pulse in pulse chain D of waveform 21. Thus, the sine wave 28 uniquely identifies each channel of duobinary information. The cutoff frequency of RC filter 5 is numericaly equal, in c.p.s. to the duobinary bit speed C. This filter eliminates all but the fundamental harmonic (in c.p.s. numerical equal to *C*/2 of the clock pulse chain.

Preferably, the amplitude of the sine wave from filter 5 is about 8 db lower than the amplitude of the duobinary transmitted waveform. The advantage of the lower amplitude is that the contribution of the sine wave to total power being transmitted is negligible. The need for any auxiliary power to transmit the framing sine wave with the data is thus eliminated.

Both the sine wave from filter 5 and the duobinary waveform from converter 4 are passed to an arithmetic summer 6, where they are added together. Arithmetic summer 6 is merely a pair of resistors tied together at one terminal. The tied terminals comprise the output, and the free terminals comprise each of the two inputs. The zero-crossings of the sine wave fall at the center of each duobinary pulse. Since duobinary pulses are detected in the receiver at their centers, the sine wave of zero amplitude at these detection points would in no way interfere with duobinary detection and duobinary-binary reconversion.

The combined duobinary waveform and sine wave are shown as waveform 29 in FIG 2. This information is passed to modulation, transmission, and demodulation systems shown in block 7 in FIG. 1. Exemplary transmission systems are described in the above-mentioned copending patent application. The sine wave, now integrated with the duobinary signal, provides the transmitted data with a framing system sufficient to uniquely identify each of channels A and B at the receiving end of the system.

The duobinary waveform and sine wave from the demodulation system 7 are passed through a low-pass filter 8 (known as a post-detection filter) into duobinary-binary reconverter 9. This reconverter is fully described in the above-mentioned copending patent application. The output binary data from reconverter 9 is a binary pulse chain at C b.p.s. containing the two interleaved binary data channels A and B. It is now necessary, according to this invention, to separate this data into the original two channels A and B.

This separation is accomplished by recovering the framing sine wave. This sine wave is obtained from terminal 10 lying after the demodulation system, but prior to the low-pass post-detection filter 8. The signal from terminal 10 is passed to bandpass filter 11, tuned to the frequency *C*/2. This filter extracts the sine wave transmitted at its bandpass frequency. The recovered sine wave is then converted to two series of clock pulses 180° out-of-phase, each at the rate of *C*/2 p.p.s. The first such pulse chain of positive pulses is in-phase with the positive-going zero-crossings of the sine wave (the in-phase pulse chain). The other positive pulse chain is 180° out-of-phase with the first, and is phased with the negative-going zero-crossings of the sine wave (the out-of-phase pulse chain). The apparatus used for deriving these two pulse chains from the recovered sine wave is called "squaring circuit," for example, a Schmitt trigger 12, and an RC differentiator 13. A Schmitt trigger is a regenerative bistable circuit whose state depends upon the amplitude of the input voltage. It is therefore very useful in squaring sinusoidal inputs, such as the one obtained from bandpass filter 11. The output of the Schmitt trigger is connected to RC differentiator 13 which provides a chain of positive and negative output pulses shown as waveform 30 in FIG. 2. The upper chain or positive pulses are time-coincident with original clock pulse chain D' (waveform 20). The negative pulses from differentiator 13 are time-coincident with clock pulse chain D (waveform 21). The output pulse chain 30 from differentiator 13 (having both polarity pulses) is passed directly to one input of AND-gate 14. However, only the positive pulses of waveform 30, corresponding to original clock pulse chain D', will alert AND-gate 14 (a positive gate). The output pulses from differentiator 13 are also passed to polarity inverter 15 which alternates the polarities of the pulses of waveform 30 to make up waveform 31. Thus, the formerly negative pulses of waveform 30 become the positive pulses of waveform 31 which are used as the clock pulses to one input of AND-gate 16.

When the binary data at C b.p.s., from reconverter 9 is passed to both AND-gates 14 and 16, as shown in FIG. 1, gated with the two sets of pulses from differentiator 13, only binary data channel A, coincident with clock pulses D' emerges from AND-gate 14 at a bite rate of *C*/2 b.p.s. Similarly, only binary data channel B, coincident with clock pulses D emerges from AND-gate 16 at a bit rate of $C/2$ b.p.s. Thus at the receiver, channels A and B have been uniquely identified and separated.

In summary, the system of this invention, using a phased sine wave transmitted along with the duobinary waveform, provides a framing system capable of uniquely identifying each binary channel. Yet, no redundant framing bits need be introduced into the transmitted information. Consequently, the fast transmission rates possible using duobinary data transmission are preserved even though framing information is transmitted along with the data.

It will be appreciated by one skilled in the art that many modifications in the particular circuitry shown and described may be made without departing from the spirit and scope of the invention. Therefore, the only limitations to be placed on that scope are those specifically recited in the claims which follow.

What is claimed is:

1. Apparatus for framing binary pulses which have been converted to duobinary pulses for transmission, said binary pulses being comprised of alternate pulses from two independent series of pulses, where said duobinary pulses are to be transmitted and then reconverted to binary pulses in a receiver having a post-demodulation filter, which apparatus comprises:

means for introducing into the converted duobinary pulses to be transmitted a sine wave of identical frequency to and in phase with one of said two series of binary pulses;

means for converting said sine wave at said receiver before it enters said post-demodulation filter into a series of clock pulses of identical frequency to and in phase with said one of said two series of binary pulses; and means for separating the binary output pulses from said receiver into a first chain of binary pulses in phase with said series of clock pulses, said first chain being said one of said independent series of binary pulses transmitted, and a second chain of binary pulses out-of-phase with said clock pulses, said second chain being the other independent series of binary pulses transmitted.

2. The apparatus of claim 1 further defined by the amplitude of said sine wave being appreciably less than the amplitude of said duobinary pulses.

3. Apparatus for framing binary pulses which have been converted to duobinary pulses for transmission, said binary pulses being comprised of alternate pulses from two independent series of pulses, where said duobinary pulses are to be transmitted and then reconverted to binary pulses at a receiver having a post-demodulation filter, which apparatus comprises:

a first means of generating a first chain of clock pulses at a fixed rate, said first chain of pulses being used to determine the transmission rate of one of said two series of binary pulses;

a second means of generating a second chain of clock pulses at the same fixed rate, said second chain of pulses being 180° out-of-phase with said first chain, said second chain of pulses being used to determine the transmission rate of the other of said two series of binary pulses;

means for converting said first chain of clock pulses to a sine wave of identical frequency to and in phase with said first chain of clock pulses;

means for introducing said sine wave into the converted duobinary pulses to be transmitted;

means for converting said sine wave at said receiver before it enters said post-demodulation filter into a third series of clock pulses of identical frequency to and in phase with said first chain of clock pulses; and means for separating the binary output pulses from said receiver into a first chain of binary pulses in phase with said third series of clock pulses, said first chain being one of said independent series of binary pulses transmitted, and a second chain of binary pulses 180° out-of-phase with said third chain of clock pulses, said second chain of binary pulses being the other independent series of binary pulses transmitted.

4. The apparatus of claim 3 further defined by said means for converting said clock pulses to a sine wave being a low-pass filter having a cutoff frequency numerically equal in cycles per second to twice said fixed rate in pulses per second.

5. The apparatus of claim 3 further defined by the amplitude of said sine wave being appreciably less than the amplitude of said duobinary pulses.

6. The apparatus of claim 3 further defined by said means for converting the sine wave at the receiver into a series of clock pulses including a bandpass filter tuned to a frequency numerically equal in cycles per second to said fixed rate in pulses per second, said filter followed by a squaring circuit and an RC differentiator.

7. Apparatus for framing binary pulses which have been converted to duobinary pulses for transmission, said binary pulses being comprised of alternate pulses from two independent series of pulses, where said duobinary pulses are to be transmitted and then reconverted to binary pulses at a receiver having a post-demodulation filter, which apparatus comprises:

a first clock pulse generator generating a first chain of pulses at a fixed rate, said first chain of pulses being used to determine the transmission rate of one of said two series of binary pulses;

a second clock pulse generator generating a second chain of clock pulses at the same fixed rate, said pulses being 180° out-of-phase with said first chain, said second chain of pulses being used to determine the transmission rate of the other of said two series of binary pulses;

a low-pass filter tuned to a cutoff frequency in cycles per second numerically equal to twice said fixed pulse rate in pulses per second and connected to receive said first chain of pulses, the output signal from said low-pass filter being a sine wave of frequency in cycles per second numerically equal to said fixed rate;

means for introducing said sine wave into the converted duobinary pulses to be transmitted;

a bandpass filter at the receiver before said post-demodulation filter, said bandpass filter having a bandpass frequency in cycles per second numerically to said fixed rate in pulses per second, said filter being adapted to recover said sine wave;

a means for converting said recovered sine wave from said bandpass filter into a third chain of clock pulses of identical frequency to and in phase with said first chain of the clock pulses; and means for separating the binary output pulses from said receiver into a first channel of binary pulses in phase with said third chain of clock pulses, said first channel of binary pulses being said one of said independent series of binary pulses transmitted, and a second channel of binary pulses 180° out-of-phase with said third chain of clock pulses, said second channel of binary pulses being the other independent series of binary pulses transmitted.

8. The apparatus of claim 7 further defined by said means for converting said sine wave from said bandpass filter into a chain of clock pulses being a squaring circuit followed by an RC differentiator.

9. A method of framing binary pulses which have been converted to duobinary pulses for transmission, said binary pulses being comprised of alternate pulses from two independent series of pulses, where said duobinary pulses are to be transmitted and then reconverted to binary at a receiver having a post-demodulation filter, which method comprises:

introducing into the duobinary pulses to be transmitted a sine wave of identical frequency to and in phase with one of said two series of converted binary pulses;

isolating said sine wave at said receiver before it enters said post-demodulation filter and converting said sine wave into a series of clock pulses of identical frequency to and in phase with said one of said two series of binary pulses; and separating the binary output pulses fom said reconverter into (a) a first chain of binary pulses in phase with said series of clock pulses converted from said sine wave, said first chain being said one of said independent series of binary pulses transmitted, and (b) a second chain of binary pulses 180° out-of-phase with said clock pulses converted from said sine wave, said second chain being the other independent series of binary pulses transmitted.

References Cited by the Examiner

UNITED STATES PATENTS

| | | | |
|---|---|---|---|
| 3,060,268 | 10/1962 | Pinet | 179—15 |
| 3,230,310 | 1/1966 | Brogle | 178—68 |

DAVID G. REDINBAUGH, *Primary Examiner.*

S. J. GLASSMAN, *Assistant Examiner.*